(12) United States Patent
Cheung (10) Patent No.: US 12,098,304 B2
(45) Date of Patent: Sep. 24, 2024

(54) CONTACT ADHESIVES AND USES THEREOF

(71) Applicant: HENKEL AG & CO. KGaA, Duesseldorf (DE)

(72) Inventor: Chuiwah Alice Cheung, Hillsborough, NJ (US)

(73) Assignee: HENKEL AG & CO. KGaA, Duesseldorf (DE)

( * ) Notice: Subject to any disclaimer, the term of this patent is extended or adjusted under 35 U.S.C. 154(b) by 0 days.

(21) Appl. No.: 17/032,919

(22) Filed: Sep. 25, 2020

(65) Prior Publication Data

US 2021/0009869 A1    Jan. 14, 2021

Related U.S. Application Data (63) Continuation of application No. PCT/US2019/027581, filed on Apr. 16, 2019.

(60) Provisional application No. 62/658,655, filed on Apr. 17, 2018.

(51) Int. Cl.
| | | |
|---|---|---|
| C09J 7/21 | (2018.01) | |
| C09J 7/38 | (2018.01) | |
| C09J 153/00 | (2006.01) | |

(52) U.S. Cl.
CPC .............. *C09J 153/00* (2013.01); *C09J 7/21* (2018.01); *C09J 7/387* (2018.01); *C09J 2301/122* (2020.08); *C09J 2301/302* (2020.08); *C09J 2301/408* (2020.08); *C09J 2301/414* (2020.08); *C09J 2423/04* (2013.01)

(58) Field of Classification Search
None
See application file for complete search history.

(56) References Cited

U.S. PATENT DOCUMENTS

| | | | |
|---|---|---|---|
| 3,645,992 A | 2/1972 | Elston | |
| 4,471,086 A * | 9/1984 | Foster | .............. C09J 123/06 |
| | | | 524/489 |
| 5,965,657 A | 10/1999 | Voegtli et al. | |
| 7,267,878 B2 * | 9/2007 | Primke | .............. C08J 3/12 |
| | | | 156/331.7 |
| 7,608,668 B2 | 10/2009 | Li Pi Shan et al. | |
| 7,893,166 B2 | 2/2011 | Shan et al. | |
| 7,947,793 B2 | 5/2011 | Marchand et al. | |
| 8,163,833 B2 * | 4/2012 | Moeller | .............. C09J 123/0815 |
| | | | 524/505 |
| 2010/0197880 A1 | 8/2010 | Shan et al. | |
| 2012/0149827 A1 * | 6/2012 | Hu | .............. C09J 5/00 |
| | | | 524/505 |
| 2014/0023870 A1 * | 1/2014 | Takamori | .............. C09J 7/21 |
| | | | 524/275 |

FOREIGN PATENT DOCUMENTS

| | | | |
|---|---|---|---|
| EP | 2358835 B1 | 9/2012 | |
| JP | 2007-529616 A | 10/2007 | |
| JP | 2016-537477 A | 12/2016 | |
| WO | 9733921 A1 | 9/1997 | |
| WO | 0000565 A1 | 1/2000 | |
| WO | 2004083331 A1 | 9/2004 | |
| WO | 2010070046 A1 | 6/2010 | |
| WO | 2011011729 A1 | 1/2011 | |
| WO | 2011022523 A2 | 2/2011 | |
| WO | WO-2022187179 A1 * | 9/2022 | .............. B65D 65/38 |

OTHER PUBLICATIONS

"Standard Test Method for Dropping Point of Waxes", ASTM D3954-15 standard, pp. 1-2, retrieved on Jul. 13, 2021 (Year: 2021).*
Potemkin, I. . and Panyukov, S. V. "Microphase separation in correlated random copolymers: Mean-field theory and fluctuation corrections:" Physical Review E (1998) 57 (6), pp. 6902-6912.
Dobrynin, A. "Phase coexistence in random copolymers." J. Chem. Phys. (1997) 107 (21), pp. 9234-9238.

\* cited by examiner

*Primary Examiner* — Anish P Desai
(74) *Attorney, Agent, or Firm* — Sun Hee Lehmann (57) ABSTRACT

The present invention provides pre-applied contact adhesives that maintains strong cohesiveness over extended time and varied temperature conditions, while balancing low adhesiveness to other substrates. The pre-applied adhesives are applied onto paperboard, corrugated board, Kraft paper, paper, plastic film, glass, and are suitable as label, package, envelope, carton, case, box, label, bag, multilayer film, foil bag, bottle or band.

11 Claims, 2 Drawing Sheets

CONTACT ADHESIVES AND USES THEREOF

FIELD OF THE INVENTION

The invention is related to contact adhesives with high initial cohesive strength that maintains high strength over an extended period of time and various temperature conditions, making them suitable as pre-applied adhesive that eliminates release liners and reactivation.

BACKGROUND OF THE INVENTION

Pre-applied adhesives are useful for packages, tapes, labels, trim, and the like. Pre-application allows simplification of processes, particularly at the user end. Adhesives can be pre-applied onto a substrate and activated to provide adhesion. Among others, pressure sensitive adhesives and contact adhesives are pre-applied systems.

Pressure sensitive adhesives are permanently tacky, do not solidify and remain viscous, and adhere to substrates with finger or hand pressure. Pre-applied pressure sensitive adhesive is applied onto substrate, but requires a protective covering to prevent unwanted adhesion and contamination on the surface of the pre-applied pressure sensitive adhesive during shipping and handling.

Contact adhesives do not require protective coverings. Typically, a layer of contact adhesive is applied onto each of two substrates and once the two surfaces are mated, a strong bond is formed due to strong cohesive bonds. Traditional contact adhesives are made with natural rubbers and polychloroprenes and are used in high shear-resistance substrates such as Formica substrate onto wooden counters, footwears, liquid nails and artificial turf. Natural rubbers and polychloroprene have low aging stability and discolor over time, making them optically unsuitable. In addition, natural rubbers tend to pick up impurities during application stage with trace heavy metals.

Contact adhesives based on non-reactive, olefin-based hot melt adhesive technology are described in EP 2 358 835. Excellent initial cohesive strength is realized; however, cohesiveness deteriorates and renders it unsuitable as a contact adhesive.

Accordingly, there is a need in the art for pre-applied contact adhesives that maintains cohesiveness over time and blocks adhesiveness during transportation and storage from other substrates. The current invention fulfills this need.

BRIEF SUMMARY OF THE INVENTION

The invention provides a contact adhesive that is tack-free for a prolonged time under pressure.

One aspect of the invention is directed to a contact adhesive comprising (a) a metallocene-catalyzed olefin block copolymer, (b) a mixture of polyethylene wax and Fischer-Tropsch wax having a penetration hardness value of less than about 5 dmm at 25° C., measured in accordance with ASTM D3954, (c) a plasticizer, (d) a tackifier. The contact adhesive is essentially free from polypropylene based polymer and/or wax, and passes a non-blocking test of 84% relative humidity, 72° F. with 1 kg weight for at least 500 hours.

In another aspect of the invention is directed to an article comprising (a) a first substrate; (b) a second substrate; and (c) a pre-applied contact adhesive comprising (1) a metallocene-catalyzed olefin block copolymer; (2) a mixture of polyethylene wax and Fischer-Tropsch wax having a penetration hardness value of less than about 5 dmm at 25° C., measured in accordance with ASTM D3954; (3) a plasticizer; and (4) a tackifier. The contact adhesive passes a non-blocking test of 84% relative humidity, 72° F. with 1 kg weight for at least 500 hours.

These and other aspects of the invention are described in the description below. In no event should the above summary be construed as a limitation on the claimed subject matter which is defined solely by the claimed as set forth herein.

DETAILED DESCRIPTION OF THE INVENTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the term "cohesive bond," "cohesion" and "cohesiveness," interchangeably used, is the internal strength of an adhesive as a result of a variety of interactions within the adhesive.

As used herein, the term, "adhesive bond," "adhesion" and "adhesiveness," interchangeably used, is the bonding of one material to another, namely an adhesive to a substrate, due to a variety of possible interactions.

As used herein blocking is adhesion between the contact adhesive and a touching layer, e.g., substrate, under moderate pressure during storage or use, typically described and measured by ASTM D 907-06.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values. As used herein, approximating language may be applied to modify any quantitative representation that may vary without resulting in a change in the basic function to which it is related. Accordingly, a value modified by a term or terms, such as "about," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The present invention provides printing/fabricating substrates, and more particularly to a means for applying contact adhesive to substrates, that preclude premature adhesion of the contact adhesive from adjacent substrates prior to desired adhesion, thus minimizing the use of specialized equipment and costs.

The contact adhesive layers of the invention have several advantages. Rapid processing is possible. The applied adhesive is non-tacky and thus, the substrates can be stacked immediately after application. The substrates may also be prefabricated on objects or semi-finished products, and can further be processed without the concern for adhesion onto other substrates.

Figure 1:
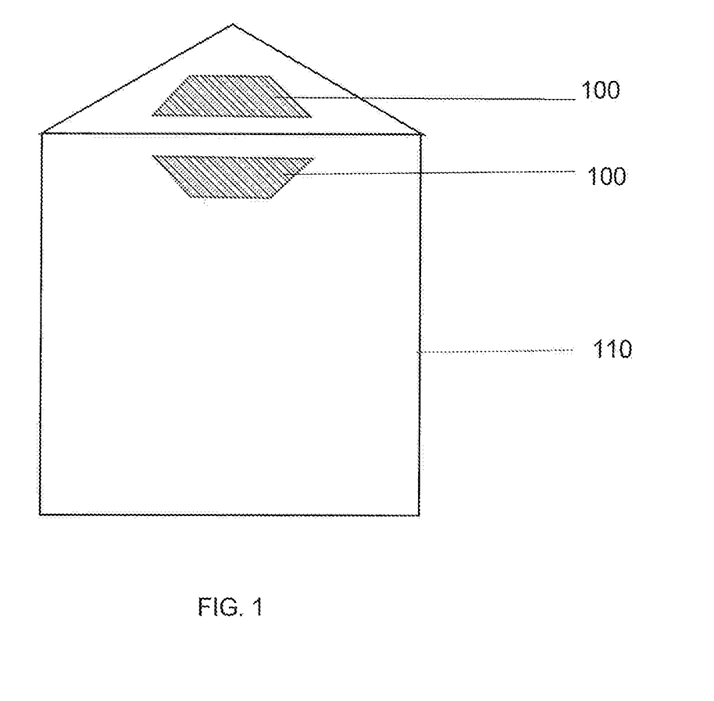
FIG. 1 is a schematic top view of an article with contact adhesives.

In FIG. 1, adhesive 100 is pre-applied onto two distinct portions of a substrate, 110. The present invention provides contact adhesive area layers without any tacky properties. A contact adhesive bonds only to itself, and does not bond to any other substrates. Only upon contact with another contact adhesive area surface, the adhesives have tacky properties. A bond can be formed with only a gentle pressure. The contact adhesive does not require any additional forms of activation (water, heat, radiation), which requires an additional component and/or processes.

Figure 2:
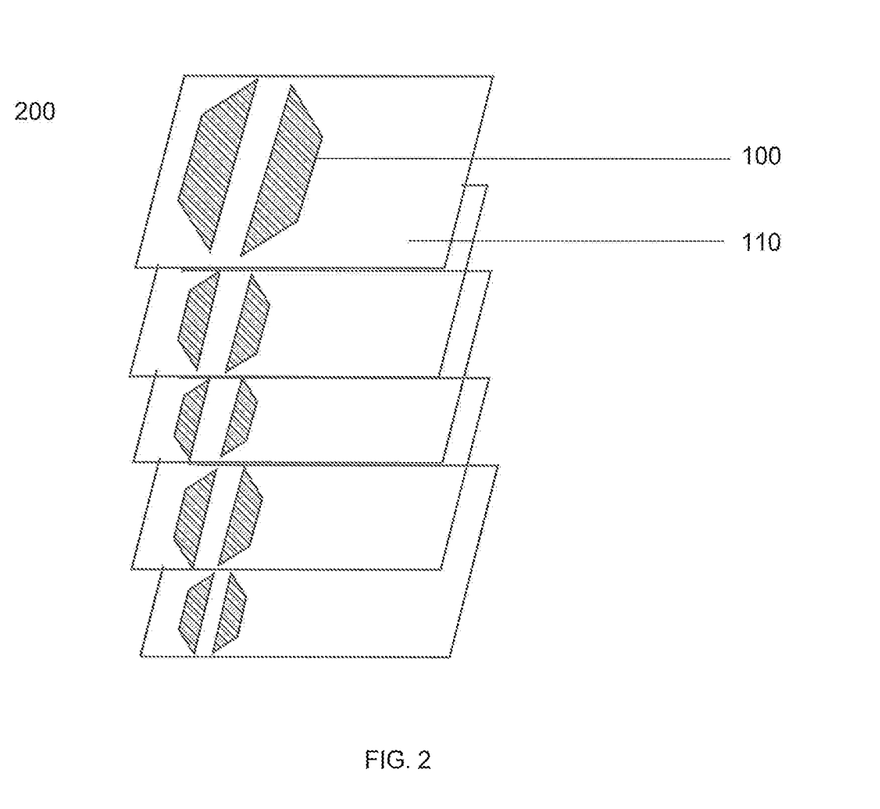
FIG. 2 is a schematic of stack of substrates with contact adhesives.

The invention also provides adhesive layers prepared with the coated substrates that can be stacked with one another and do not stick to each other over a prolonged time. In FIG. 2, substrates 110 with pre-applied contact adhesives 100 are stacked for storage and transportation. The stack 200 are stored in a manner to ensure the contact adhesives do not touch each other. Substrates with printed contact adhesive provide flexibility since they can be stacked for storage and transportation, or they can be further processed in machinery and assembly without affecting contact adhesive bonds.

One embodiment is directed to a contact adhesive comprising an olefin block copolymer, a tackifier, a plasticizer, and a wax, wherein contact adhesive is non-tacky.

Another embodiment is directed to a layer of contact adhesive layer comprising an olefin block copolymer, a tackifier, a plasticizer, and a wax, wherein the layer has a thickness from about 2 to about 150 g/m², and the surface of the contact adhesive layer is non-tacky.

The term "olefin block copolymer" or "OBC" is an ethylene/alpha-olefin multi-block copolymer and includes ethylene and one or more copolymerizable alpha-olefin comonomer in polymerized form, characterized by multiple blocks or segments of two or more polymerized monomer units differing in chemical or physical properties. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an alpha-olefin having 3 or more carbon atoms. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount of 92 mol % to 99 mol %, 96 mol % to 98 mol % or 95 mol % to 98 mol %. In other words, the comonomer content (content of monomers other than ethylene) in the hard segments is 1 mol % to 8 mol %, 2 mol % to 5 mol % or 2 mol % to 4 mol %. "Soft" segments are blocks of polymerized units in which the comonomer content (content of monomers other than ethylene) is 10 mol % to 15 mol %, 10 mol % to 13 mol % or 11 mol % to 12 mol %. In other words, the ethylene content is 85 mol % to 90 mol %, 86 mol % to 89 mol % or 87 mol % to 88 mol %. A difference of at least one half mole percent is statistically significant. The hard segments can be present in the OBC in amounts of 20 wt %-45 wt %, preferably 25 wt % to 40 wt %, more preferably 30 wt % to 40 wt % by weight of the block copolymer, with soft segments comprising the remainder. The soft segment weight percentage and the hard segment weight percentage can be calculated based on data obtained from DSC or NMR, and mole percentages calculated therefrom. Such methods and calculations are disclosed in, for example, U.S. Pat. No. 7,608,668, entitled "Ethylene/alpha-Olefin Block Interpolymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, Physical Review E (1998) 57 (6), pp. 6902-6912, and Dobrynin, J. Chem. Phys. (1997) 107 (21), pp 9234-9238.

In an embodiment, the present olefin block copolymer possesses a most probable distribution of block lengths.

In an embodiment, the olefin block copolymer is defined as having:
(A) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or
(B) average block index greater than zero and up to 1.0 and a molecular weight distribution, Mw/Mn greater than 1.3. Block Index can be determined as described in detail in U.S. Pat. No. 7,608,668 herein incorporated by reference for that purpose. Analytical methods for determining properties (A) through (B) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched alpha-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin block copolymer has a density of from 0.850 g/cc to 0.880 g/cc, or from 0.850 g/cc to 0.879 g/cc. In an embodiment, the olefin block copolymer has a melt index (MI) from 5 g/10 min to 1000 g/10, or from 15 g/10 min to 50 g/10 min, or from 20 g/10 min to 40 g/10 min, as measured by ASTM D 1238 (190° C./2.16 kg). The olefin block copolymer is present in an amount of 10 wt % to 45 wt %, preferably 15 wt % to 40 wt %, more preferably 20 wt % to 35 wt %, based on total weight of formulation. The olefin block copolymer has an Mw of 15,000 to 100,000 g/mol or preferably of 20,000 to 75,000. The olefin block copolymer has a Tm as measured by DSC of 60° C. to 115° C., of 80° C. to 110° C., or of 90° C. to 105° C. The olefin block copolymer also has a Tc as measured by DSC of 45° C. to 100° C., of 60° C. to 90° C. or of 70° C. to 80° C. In some embodiments, the total crystallinity of the olefin block copolymers is 5 wt %-30 wt %, preferably 10 wt % to 25 wt %, more preferably 15 wt % to 20 wt %. The olefin block copolymers are produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793 as well as US Patent Application Publication No. 20100197880.

Olefin block copolymers differ from olefin random copolymer or interpolymers. The ethylene/alpha olefin copolymer comprises a first homogeneously branched random ethylene/alpha-olefin copolymer and a second homogeneously branched random ethylene/alpha-olefin copolymer. "Random copolymer" or 'interpolymer" means a copolymer wherein the at least two different monomers are arranged in a non-uniform order. The term "random copolymer" and "interpolymer" specifically excludes block, OBC, copolymers. The term "homogeneous ethylene polymer" as used to describe ethylene polymers is used in the conventional sense in accordance with the original disclosure by Elston in U.S. Pat. No. 3,645,992, the disclosure of which is incorporated herein by reference, to refer to an ethylene polymer in which the comonomer is randomly distributed within a given polymer molecule and wherein substantially all of the polymer molecules have substantially the same ethylene to comonomer molar ratio.

It is important for the contact adhesive to essentially be free of any polypropylene based polymer or waxes. Typical polymers have a weight average molecular weight (Mw) of greater than about 10,000 Daltons, and typical waxes have a Mw of less than about 10,000 Daltons. Without being bound to any specific theory, the addition of a polypropylene based polymer in a contact adhesive provides crystallization, and this decreases tack over a prolonged time.

In another embodiment, the contact adhesive is essentially free from other polymers, having a weight average molecular weight of greater than 10,000 Daltons, which decreases tack and/or increases viscosity at application temperature.

The contact adhesive also comprises a mixture of soft waxes. The wax mixture is a combination of soft polyethylene waxes and soft Fischer-Tropsch waxes. The wax, individually and as a mixture, has a penetration hardness value of less than or equal to about 5 dmm, preferably less than or equal to about 4 dmm, and most preferably less than or equal to about 3 dmm at 25° C., measured in accordance with ASTM D1321.

The drop point (measured according to ASTM D 3954) of the wax, individually or as a mixture, is from about 60 to 160° C., preferably from about 80 to 120° C. The weight average (Mw) molecular weight of the wax, individually or as a mixture, ranges from about 200 to about 7000 Daltons. Wax is added at a levels of about 0.5 to about 15 wt % based on the total weight of the adhesive.

A plasticizer is also added to the contact adhesive. Suitable plasticizers include esters or polyoxyalkylene, and medicinal white oils, naphthenic, aliphatic or aromatic mineral oils, polypropylene, polybutene, polyisoprene oligomers, hydrogenated polyisoprene and/or polybutadiene oligomers are particularly suitable. Hydrogenated plasticizers are for example selected from the group of paraffinic hydrocarbon oils. In particular, white oils, mineral oils, polyisobutylene and hydrogenated hydrocarbons are suitable. Plasticizers having a molecular weight of about 200 to 5000 g/mol are preferred. The plasticizers with a boiling point above 200° C. is preferred to maintain stable storage for a prolonged time. The amount of the plasticizer should be up to 15 wt %, in particular, from about 3 to about 10%.

The contact adhesive further comprises a tackifying resin. The tackifying resin increases the adhesion and improves the miscibility and compatibility of the various components in the adhesive. It is generally used in an amount of from about 20 to about 70 wt %, in particular from about 25 to about 60 wt %, based on the total weight of the adhesive.

Suitable tackifying resin include aromatic, aliphatic or cycloaliphatic hydrocarbon resins and modified or hydrogenated natural resins. Examples include terpene resins, such as copolymers of terpene; modified natural resins such as resin acids from gum rosin, tall oil rosin or rosin, optionally also hydrocarbyl and its esters; acrylic acid copolymers such as styrene-acrylic acid copolymers or copolymers of ethylene, acrylate esters, and maleic anhydride; or resins based on functional hydrocarbon resins. As a tackifier resin, low molecular weight reaction products are suitable which consist of the ethylene/propylene-α-olefin polymers mentioned above. The molecular weight of such as a resin of suitable olefin polymers is usually below 2000 g/mol, and has a softening point of 80 to 140° C. (ASTM method E28). Particularly preferred resins are fully or partially hydrogenated hydrocarbon resins or natural resins based on rosin and tall oil rosin.

The contact adhesive comprises optional components including stabilizers, coupling agents, antioxidants, fillers and/or pigments or other polymers. The amount of the additives is in the range of about 0.01 to about 30 wt %.

The hot melt adhesive of the invention is prepared by known methods, by mixing in the melt. In this case, all components can be presented simultaneously heated and then homogenized, or easily melted components will be first submitted to and mixed, then the further resin components. It is also possible to continuously produce the hot melt adhesive in an extruder.

The present invention suitable melt adhesive should have a viscosity of 500 to 20,000 mPas, preferably from 300 to 10,000, measured at 165.6° C. (330° F.) (Brookfield, EN ISO 2555, measured at the temperature indicated).

The layer thickness of the applied adhesive, is for example from about 2 to about 150 microns (2 to 150 g/m$^2$). In particular, the film thickness should be less than 75 microns. The adhesive may be applied in a molten state at about 250 to about 350° F. to a given substrate and upon cooling, the contact adhesive is no longer tacky. The substrates with the applied contact adhesive may then be stored in this non-blocky (non-tacky) form.

The contact adhesive of the invention balances the adhesiveness to substrates upon application, maintains cohesive properties and remain non-blocky throughout the transportation and storage phase, and maintains strong cohesive strength even after aging conditions to fully bond substrates together.

In this state, the adhesive layer is to be stored without losing its cohesive characteristics. A bond is achieved later by pressing against a second substrate having the same adhesive. For bonding, the coated substrate with an adhesive layer, according to the invention, is pressed with a second substrate against each other, this must also have a corresponding adhesive layer on the body to be bonded. Pressing may be done under light pressure, as can be exercised, for example, by hand in the bonding of paper or plastic substrates.

A major drawback to contact adhesives is that they can become tacky over time, especially if they encounter moisture and/or heat. This becomes exacerbated if the contact adhesive is stacked against another substrate under some form of weight.

The coated substrates with the instant contact adhesives are storable. It is possible to stack the substrates with the instant contact adhesive immediately after production and cooling. It is important to ensure that the adhesive layers of the invention are not supported against each other, but against other substrate layers without the adhesive. Since the adhesive layer of the invention is not tacky, sticking and blocking of stacked substrates from the contact adhesive is not observed. In a subsequent use, they can be easily separated from each other. The non-sticky, pre-space-saving storage is possible since the substrate is easily separated from the contact adhesive.

The inventive contact adhesive remains non-blocky and passes a blocking test of 84% relative humidity, 72° F. with 1 kg weight for at least 500 hours.

The preformed and coated articles may then be brought into a final shape by the user. It is necessary that both surfaces are provided with an adhesive layer, and the bond is made when the two contact adhesive layers are joined together. Such articles require a first substrate, a second substrate, and two pre-applied contact adhesive layers. The first and second substrate may be located on the same article and can be on a continuous substrate, but on different portions of the same substrate. In a different embodiment, the first and the second substrate may independently be on different substrates but on the same article. Moreover, the contact adhesives may be used to join two separate and distinct substrates together. Again, the two substrates may be the same or different.

The contact adhesive layers of the invention can be applied to various substrates, and they include, for example, paper, coated paper, Kraft paper, paperboard, corrugated board, cardboard, foils, plastic film, glass, or metallized or painted surfaces. It is also possible to coat plastic surfaces of polyethylene, polypropylene, such as flexible film or multilayer composite material, or solid substrates such as bottles or cups. The adhesive allows for quick application process. The coated products are stored and stacked for extended time without developing tack to the other substrates. Final products may be brought into the final shape by joining the two contact adhesive surfaces together.

The corresponding bonded products can be used in many application areas, such as labels, multilayer film material, foil bag, envelope, folding carton, or straps in the hygiene industry, bandages, medical bandages or packaging of any shape. The application fields of the contact adhesive layers are wide. It can be made of paper substrates pre-coated paper laminates, such as envelopes. Another field of application is the coating of flexible flat belts which can serve together with other bands as a closure, known Velcro fasteners. Yet another field of application is pre-coated labels. These can be glued to other coated substrates. It may be plastic, paper or laminated labels. In another example, the article that comprises the contact adhesives has additional adhesives. For instance, article may include at least one additional adhesive or coating, such adhesive or coating is a hot melt, waterborne emulsion, foamed, or thermoset adhesive; or coating on a different portion of the article. The additional adhesive or coating may further comprise microspheres, fillers, heat transfer agents, cushioning agents, and the like. The contact adhesive may be applied and does not interfere in further processing of the additional adhesive and/or coating.

EXAMPLES

Table I describes the components of the inventive contact adhesive (Example.) and Comparative Examples A, B, C and D. Each adhesive was homogenized under heat. All of the adhesives were clear white upon homogenization.

TABLE I

| Components | Ex (wt %) | Comp Ex A (wt %) | Comp Ex B (wt %) | Comp Ex C (wt %) | Comp Ex D (wt %) |
|---|---|---|---|---|---|
| Olefin block copolymer | 18 | 9.1 | 12 | 20 | 18 |
| Polypropylene copolymer | | 9.1 | 6 | | |
| Polypropylene wax | | 18.1 | | | |
| polyethylene wax (hardness = 7) | | | | 12 | |
| Polyethylene wax (hardness = 3) | 14 | | 18 | | |
| Polyethylene wax (hardness < 1) | 4 | 4 | 4 | 4 | |
| Fischer-Tropsch wax (hardness = 1) | 3 | 3 | 3 | 3 | |
| LDPE 955I* from Dow Chemical | | | | | 15 |
| Hydrocarbon Resin | 47 | 46.7 | 47 | 47 | 53 |
| Liquid Polybutene | 13.5 | 9.5 | 9.5 | 13.5 | 13.5 |
| Anti-oxidant | 0.5 | 0.5 | 0.5 | 0.5 | 0.5 |

*As described in U.S. Pat. No. 9,914,860

Example 1. Aging

The adhesives were applied separately onto two Kraft papers at 330° F. with a thickness of 1.5 mil by 0.5 inch (width) and about 4 inch (length) and were aged at room temperature for specified times as noted in Table II. The adhesives were then pressed onto each other with a 2.3 Kg roller press. For example, after 1 day of aging, the adhesive coating on the two Kraft papers were pressed together to form a cohesive bond using a 2.3 Kg press and were pulled apart by hand and the percent fiber tear was noted. 100% fiber tear indicates the bond between the two contact adhesive layers was not separable, and resulted in substrate fiber tear: strong cohesive bond. 0% fiber tear indicates the bond between the two contact adhesives were easily separable by hand and no substrates were torn during the test: weak cohesive bond. The Example and Comparative Example Chad excellent cohesive bond strength throughout the aging conditions, 100% average fiber tear. Comparative Example A and B had weak cohesive bond strength.

TABLE II

| Fiber tear | Ex | Comp Ex A | Comp Ex B | Comp Ex C |
|---|---|---|---|---|
| 1 Day Aging | 100 | 0 | 100 | 100 |
|  | 100 | 0 | 0 | 100 |
|  | 100 | 0 | 0 | 100 |
| % Average Fiber Tear | 100 | 0 | 33 | 100 |
| 5 Days Aging | 100 | 0 | 100 | 100 |
|  | 100 | 0 | 100 | 100 |
|  | 100 | 0 | 100 | 100 |
| % Average Fiber Tear | 100 | 0 | 100 | 100 |
| 11 Days Aging | 0 | 0 | 25 | 100 |
|  | 100 | 0 | 100 | 100 |
|  | 100 | 0 | 0 | 100 |
| % Average Fiber Tear | 67 | 0 | 42 | 100 |
| 22 Days Aging | 100 | 0 | 0 | 100 |
|  | 100 | 0 | 100 | 100 |
|  | 100 | 0 | 100 | 100 |
| % Average Fiber Tear | 100 | 0 | 67 | 100 |

Example 2. Blocking

To determine the blocking resistance to contact adhesive coated substrates, a thickness of 1.5 mil of the adhesive was applied onto a Kraft paper and cooled. A second, non-coated Kraft paper was placed atop of the cooled adhesive and a 1 kg weight was placed atop of the stack. This was placed in a chamber of 84% relative humidity and 72° F. storage for 72 hours. At the end of the 72 hours, the non-coated Kraft paper was separated by hand from the adhesive coated Kraft paper and the former was examined to determine whether the adhesive developed adhesion to the second, non-coated Kraft paper. The results are shown in Table III. Fiber pick up was observed on the second non-coated Kraft paper for Example, indicating only contaminates of fiber was visible on the adhesive and the contact adhesive was non-blocking. For Comparative Example C, fiber tears of the substrates were visible on the contact adhesive, indicating Comparative Example C developed adhesion under moisture, heat and weight to the non-coated Kraft paper. As such, Comparative Example C, over time, pressure, and moisture develops strong adhesion to surrounding substrates and will not be suitable as contact adhesive.

TABLE III

| Blocking Test - 84% RH, 72° F., 72 hours, 1 kg Weight | Ex | Comp Ex A | Comp Ex B | Comp Ex C |
|---|---|---|---|---|
| 84% RH 72° F. 72 h 1 kg weight | fiber pick up fiber pick up fiber pick up fiber pick up | not tested | not tested | fiber tear fiber tear fiber tear fiber tear |

Fiber tear

Example 3. Temperature Variations

The adhesives were applied on to two Kraft papers t 330° C. with a thickness of 1.5 mil by 0.5 inch (width) and about 4 inches (length. The adhesives were then pressed onto each other with a 2.3 Kg roller press. They were then stored under the temperature condition, as shown in Table IV for 192 hours. The substrates were pulled apart by hand and the percent fiber tear was noted in Table IV.

TABLE IV

| Storage Test - aged at T condition for 192 hours | Ex | Comp Ex A | Comp Ex B | Comp Ex C |
|---|---|---|---|---|
| 20° F. | 100 100 100 | not tested | not tested | 100 100 100 |
| % Average Fiber Tear | 100 | | | 100 |
| RT | 100 100 100 | not tested | not tested | 100 100 100 |
| % Average Fiber Tear | 100 | | | 100 |
| 115° F. | 100 100 100 | not tested | not tested | 100 100 100 |
| % Average Fiber Tear | 100 | | | 100 |

Example and Comparative Example C showed good cohesion throughout the aging process as noted in Table IV. However, only Example met the requirements of good cohesion throughout aging process, non-blocking to other substrates and maintained cohesion even after aging conditions. Comparative Examples with polypropylene wax or polypropylene polymer had poor aging performances. Only Example with soft waxes, provided extended blocking resistance.

Example 4. Blocking and Cohesion Test

The Example adhesive and the Comparative Example D adhesive were applied onto a Kraft paper at temperatures specified in Table V and cooled. Blocking resistance test was conducted under conditions specified in Table V by placing a second, non-coated Kraft paper atop of the cooled adhesive and a 1 kg weight was placed atop of the stack. In Example sample, when the blocking test was performed at 140° F., fiber pick-up was observed on the second non-coated Kraft paper which means only contaminates of fiber was visible on the adhesive. In addition, there was no oil stain on the non-coated Kraft paper. For the Comparative Example D, no fiber pick-up was observed on the second non-coated Kraft paper. However, oil stain was left on the second non-coated Kraft paper when the blocking test was performed at 140° F. The coated adhesives of the Example sample were then pressed onto each other with a 2.3 Kg roller press. The substrates were then pulled apart and percent average fiber tear was recorded in Table V. As shown in Table V, no fiber tear was observed in Comparative Example D and 92% fiber tear was observed in the Example sample.

TABLE V

| | Ex | Comp Ex D |
|---|---|---|
| Application Temperature (° F.) | 330 | 370 |
| Blocking test 0° F., 72 h, 1 kg Weight | No fiber pick-up | Not tested |
| Blocking test room temperature, 72 h, 1 kg Weight | No fiber pick-up | Not tested |
| Blocking test 140° F., 72 h, 1 kg Weight | fiber pick-up no oil stain | no fiber pick-up oil stain |
| Cohesion test after blocking test at 140° F. % Average fiber tear | 92 | 0 |

Example maintained strong cohesion after aging for extended period of time at room temperature, resisted blocking from non-coated surface, showed no oil migration to the surface of the non-coated substrate when compared to Comparative Example B, C and D.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

I claim:

1. A contact adhesive comprising:
   (a) a metallocene-catalyzed olefin block copolymer;
   (b) a wax mixture consisting of a first polyethylene wax having a hardness value of about 3 dmm at 25° C., a second polyethylene wax having a hardness value of less than about 1 dmm at 25° C., and Fischer-Tropsch wax having a hardness value of about 1 dmm at 25° C., wherein the wax mixture has a penetration hardness value of less than about 5 dmm at 25° C., and wherein the hardness values are measured in accordance with ASTM D1321;
   (c) a plasticizer; and
   (d) a tackifier,
   wherein the contact adhesive is free from a polypropylene based polymer or a polypropylene based wax, and wherein the contact adhesive is blocking resistant for up to 72 hours upon a testing method consisting of:

(i) applying the contact adhesive onto a Kraft paper in a molten state at a temperature of 250-350° F. and at a thickness of 1.5 mil;
(ii) cooling the contact adhesive is cooled to room temperature;
(iii) placing a second non-coated Kraft paper atop of the cooled contact adhesive to form a stack;
(iv) placing a 1 kg weight atop of the stack; and
(v) placing the stack in a chamber of 84% relative humidity and at a temperature of 72° F. storage for 72 hours.

2. The contact adhesive of claim 1, wherein the metallocene-catalyzed olefin block copolymer is an ethylene-octene block copolymer.

3. The contact adhesive of claim 1, further comprising an additive selected from the group consisting of antioxidant, brighteners, fillers, adhesion promoters, pigments, and mixtures thereof.

4. An article comprising:
a substrate selected from the group consisting of paperboard, corrugated board, Kraft paper, paper, plastic film, foil, glass, and mixtures thereof; and
the contact adhesive of claim 1 applied to at least a portion of the substrate.

5. The article of claim 4, wherein the article is a label, package, envelope, carton, case, box, bag, multilayer film, foil bag, bottle, or bandage.

6. An article comprising:
(a) a first substrate;
(b) a second substrate; and
(c) the contact adhesive of claim 1 applied to at least a portion of the first substrate or a portion of the second substrate to join the first substrate with the second substrate.

7. The article of claim 6, wherein the first substrate and the second substrate are the same substrate.

8. The article of claim 6, wherein the first and the second substrates are independently selected from the group consisting of a paperboard, corrugated board, Kraft paper, paper, plastic film, glass, and mixtures thereof.

9. The article of claim 6, wherein the contact adhesive is applied to at least the portion of the first substrate and to at least the portion of the second substrate.

10. The article of claim 6, wherein the article further comprises a coating or a second adhesive, wherein the coating or the second adhesive comprises a matrix and a plurality of microspheres.

11. The article of claim 6, wherein the article is a label, package, envelope, carton, case, box, bag, multilayer film, foil bag, bottle, or bandage.

\* \* \* \* \*

UNITED STATES PATENT AND TRADEMARK OFFICE
CERTIFICATE OF CORRECTION

PATENT NO. : 12,098,304 B2
APPLICATION NO. : 17/032919
DATED : September 24, 2024
INVENTOR(S) : Chuiwah Alice Cheung Page 1 of 1

It is certified that error appears in the above-identified patent and that said Letters Patent is hereby corrected as shown below:

In the Claims

Column 13, Line 4 Claim 1 change "cooling the contact adhesive is cooled to room temperature" to --cooling the contact adhesive to room temperature--.

Signed and Sealed this
First Day of July, 2025

Coke Morgan Stewart
*Acting Director of the United States Patent and Trademark Office*